(12) United States Patent
Norton et al.

(10) Patent No.: US 9,840,365 B2
(45) Date of Patent: Dec. 12, 2017

(54) CAPSULE AND A SYSTEM FOR, AND A METHOD OF, PREPARING A BEVERAGE

(75) Inventors: Mark Norton, March (GB); Nick Andrew Hansen, Banbury (GB)

(73) Assignee: Kraft Foods R&D, INC., Deerfield, IL (US)

( * ) Notice: Subject to any disclaimer, the term of this patent is extended or adjusted under 35 U.S.C. 154(b) by 0 days.

(21) Appl. No.: 14/004,641

(22) PCT Filed: Mar. 22, 2012

(86) PCT No.: PCT/GB2012/050623
§ 371 (c)(1),
(2), (4) Date: Sep. 11, 2013

(87) PCT Pub. No.: WO2012/127233
PCT Pub. Date: Sep. 27, 2012

(65) Prior Publication Data
US 2014/0004231 A1   Jan. 2, 2014

(30) Foreign Application Priority Data
Mar. 23, 2011  (GB) .................................. 1104910.3

(51) Int. Cl.
*B65D 85/804* (2006.01)
*A47J 31/06* (2006.01)
*A47J 31/36* (2006.01)

(52) U.S. Cl.
CPC ........ B65D 85/8043 (2013.01); *A47J 31/368* (2013.01); *A47J 31/0673* (2013.01); *A47J 31/3695* (2013.01)

(58) Field of Classification Search
CPC .............. B65D 85/8043; B65D 85/804; B65D 85/8046; A47J 31/00; A47J 31/02;
(Continued)

(56) References Cited

U.S. PATENT DOCUMENTS

| 2,778,739 A | * | 1/1957 | Rodth ................. A47J 31/0673 |
| | | | 426/77 |
| 3,878,772 A | | 4/1975 | Nordskog |
| | | | (Continued) |

FOREIGN PATENT DOCUMENTS

| CH | WO 2011117768 A1 * | 9/2011 | .......... A47J 31/3628 |
| CN | 1759049 A | 4/2006 | |

(Continued)

OTHER PUBLICATIONS

International Search Report and Written Opinion of the International Searching Authority, dated Sep. 27, 2012, for PCT/GB2012/050623 (10 pgs.).

(Continued)

*Primary Examiner* — Michele L Jacobson
*Assistant Examiner* — Ericson M Lachica
(74) *Attorney, Agent, or Firm* — Fitch, Even, Tabin & Flannery LLP

(57) ABSTRACT

A capsule (1) for preparation of a beverage from a beverage ingredient (32). The capsule comprising a first section (12, 14) and a second section (15, 40) which together form a beverage ingredient compartment of the capsule in which is received a beverage ingredient. The first section comprising a pre-formed inlet (23) for entry of aqueous medium into the capsule and the second section comprising a pre-formed outlet (41) for beverage formed, in use, from the beverage ingredient and the aqueous medium. Wherein the capsule is compressible when the capsule is inserted into the receptacle of a beverage preparation machine by the first section of the capsule being engaged by an inlet piercer (60) of the beverage preparation machine so as to cause movement of the first section of the capsule towards the second section of the capsule without piercing of the first or second sections.

20 Claims, 8 Drawing Sheets

(58) Field of Classification Search
CPC .... A47J 31/06; A47J 31/0642; A47J 31/0652; A47J 31/0657; A47J 31/0663; A47J 31/0668; A47J 31/0673; A47J 31/0684; A47J 31/0689; A47J 31/10; A47J 31/18; A47J 31/20; A47J 31/24; A47J 31/30; A47J 31/32; A47J 31/34; A47J 31/36; A47J 31/3623; A47J 31/3638; A47J 31/3642; A47J 31/3647; A47J 31/3657; A47J 31/3676; A47J 31/368; A47J 31/3685; A47J 31/369; A47J 31/3695; A47J 31/40; A47J 31/407; A47J 31/44; A47J 31/4403; A47J 31/4407; A47J 31/4425; A47J 31/4482; A23F 5/262; A23F 5/26
USPC ............... 426/77, 78, 79, 80, 81, 82, 83, 84; 99/295, 275
See application file for complete search history.

(56) References Cited

U.S. PATENT DOCUMENTS

| | | | | |
|---|---|---|---|---|
| 4,088,378 | A * | 5/1978 | Pallant | B60N 2/0715 248/429 |
| 4,306,492 | A | 12/1981 | Zimmermann | |
| 4,867,993 | A * | 9/1989 | Nordskog | B65D 85/8043 426/110 |
| 6,510,949 | B1 | 1/2003 | Grauer et al. | |
| 2003/0175456 | A1 | 9/2003 | Whittaker et al. | |
| 2005/0115415 | A1* | 6/2005 | Arrick | B65D 85/8043 99/348 |
| 2007/0068395 | A1 | 3/2007 | Masek et al. | |
| 2007/0186784 | A1* | 8/2007 | Liverani | A47J 31/0668 99/295 |
| 2008/0216666 | A1 | 9/2008 | Doglioni Majer | |
| 2010/0000415 | A1 | 1/2010 | Vanni | |
| 2010/0136178 | A1* | 6/2010 | Rapparini | B65D 85/8043 426/77 |
| 2010/0180775 | A1 | 7/2010 | Kollep et al. | |
| 2010/0255484 | A1* | 10/2010 | Halverson | G01N 1/38 435/6.1 |
| 2011/0041702 | A1 | 2/2011 | Yoakim et al. | |
| 2011/0045144 | A1* | 2/2011 | Boussemart | B65D 85/8043 426/80 |
| 2011/0101021 | A1* | 5/2011 | Greer | B65D 81/3211 222/1 |
| 2011/0110180 | A1* | 5/2011 | Snider | A47J 31/407 366/142 |
| 2011/0142996 | A1* | 6/2011 | Kruger | B65D 85/8043 426/80 |
| 2012/0070542 | A1* | 3/2012 | Camera | B65D 85/8043 426/77 |
| 2012/0121765 | A1 | 5/2012 | Kamerbeek et al. | |
| 2012/0148709 | A1 | 6/2012 | Kamerbeek et al. | |
| 2012/0231133 | A1 | 9/2012 | Kamerbeek et al. | |

FOREIGN PATENT DOCUMENTS

| | | |
|---|---|---|
| CN | 101448439 A | 6/2009 |
| DE | 202004014308 U1 | 11/2004 |
| DE | 202009009127 U | 9/2010 |
| EP | 1555218 A1 | 7/2005 |
| EP | 2119640 A1 * | 11/2009 |
| EP | 2196407 A1 | 6/2010 |
| EP | 2228320 A1 * | 9/2010 |
| EP | 2284102 A1 | 2/2011 |
| EP | 2537777 A1 | 12/2012 |
| EP | 2607269 A2 | 6/2013 |
| ES | 2351835 A1 | 2/2011 |
| JP | H1274719 A | 2/1989 |
| NL | 2001539 C2 | 10/2009 |
| WO | 02058522 A2 | 8/2002 |
| WO | 03073896 A1 | 9/2003 |
| WO | 2004083071 A1 | 9/2004 |
| WO | 2005079637 A1 | 9/2005 |
| WO | 2006030461 A1 | 3/2006 |
| WO | 2007095294 A2 | 8/2007 |
| WO | 2009110783 A2 | 9/2009 |
| WO | 2010128844 A1 | 11/2010 |
| WO | 2010137945 A1 | 12/2010 |
| WO | 2010137947 A1 | 12/2010 |
| WO | 2010137952 A1 | 12/2010 |
| WO | 2010137958 A1 | 12/2010 |
| WO | 2010137961 A1 | 12/2010 |
| WO | 2010137963 A1 | 12/2010 |
| WO | 2010137965 A1 | 12/2010 |
| WO | 2010137966 A1 | 12/2010 |
| WO | WO 2010137947 A1 * | 12/2010 |

OTHER PUBLICATIONS

U.K. Intellectual Property Office Combined Search and Examination Report under Sections 17 and 18(3), dated Jul. 26, 2011 for U.K. Patent Application No. GB1104910.3 (5 pgs.).
Letter from Boult Wade Tennant, dated Mar. 22, 2012 to U.K. Intellectual Property Office for U.K. Patent Application No. GB1104910.3 (1 pg.).
U.K. Intellectual Property Office Notification of Grant: Patent Serial No. GB2489409, dated Apr. 16, 2013 for U.K. Patent Application No. GB1104910.3 (2 pgs.).
European Patent Office Communication dated Jul. 31, 2014 for Application No. 12716067.9 (3 pgs.).
State Intellectual Property Office of the People's Republic of China Notification of the First Office Action, with English translation, date of Notification Sep. 2, 2014 for Application No. 201280011420.9 (16 pgs.).
Office Action Summary dated Oct. 13, 2015 for Japanese Patent Application No. 2014-500470 with English translation (7 pgs.).
Amendments received before examination, dated Dec. 20, 2013, in European Application No. 12716067.9 (16 pgs.).
Reply to Communication from Examining Division, dated Nov. 27, 2014, in European Application No. 12716067.9 (4 pgs.).
Summons to attend oral proceedings, dated Jun. 15, 2015, in European Application No. 12716067.9 (6 pgs.).
Written submission in preparation to/during oral proceedings, dated Dec. 23, 2015, in European Application No. 12716067.9 (40 pgs.).
Communication about intention to grant a European patent, dated Feb. 29, 2016, in European Application No. 12716067.9 (68 pgs.).
Notification of the Second Office Action date of notification May 14, 2015 for China Application No. 201280011420.9, with English translation (19 pgs.).

* cited by examiner

CAPSULE AND A SYSTEM FOR, AND A METHOD OF, PREPARING A BEVERAGE

CROSS REFERENCE TO RELATED APPLICATIONS

This application is a U.S. national phase application of International Application No. PCT/GB2012/050623, filed Mar. 22, 2012, which claims benefit from United Kingdom Application No. 1104910.3, filed Mar. 23, 2011, both of which are hereby incorporated herein by reference in their entirety.

FIELD

A capsule, a system, and a method of preparing a beverage are described herein.

BACKGROUND

Single serve beverage brewing systems may use a beverage preparation machine and disposable capsules (also referred to as cartridges) for forming single servings of beverage. The capsules for use with such systems are pre-packed with beverage ingredients and are sealed prior to use. In use the capsules are pierced during or after insertion into the beverage preparation machine so as to form an inlet for aqueous medium, such as water, to enter the capsule and beverage to exit the capsule. Since the capsules are pierced in use they are not suitable for re-use. In addition, while the capsules may be constructed from a variety of different materials and in a variety of different manners, not all lead to cost-effective manufacture. Further, the capsules are only suitable for use with pre-packed beverage ingredients.

SUMMARY

The present disclosure provides a capsule for preparation of a beverage from a beverage ingredient, the capsule being suitable for use in a beverage preparation machine of the type comprising a receptacle for holding the capsule and having a fluid dispensing apparatus for supplying aqueous medium to the receptacle; the capsule comprising:

a first section and a second section which together form a beverage ingredient compartment of the capsule in which is received a beverage ingredient;

the first section comprising a pre-formed inlet for entry of aqueous medium into the capsule;

the second section comprising a pre-formed outlet for beverage formed, in use, from the beverage ingredient and the aqueous medium;

wherein the capsule is compressible when the capsule is inserted into the receptacle of the beverage preparation machine by the first section of the capsule being engaged by an inlet piercer of the beverage preparation machine so as to cause movement of the first section of the capsule towards the second section of the capsule without piercing of the first or second sections.

Advantageously the compression of the capsule may be used to compress the beverage ingredient held in the beverage ingredient compartment which may have beneficial effects in improving the extraction of the beverage ingredient.

Use of a pre-formed inlet and outlet for the capsule may achieve more consistent and predictable flow of aqueous medium through the capsule compared to inlets and outlets that are pierced during dispensation.

The first and second sections may be interconnected by a deformable section.

The deformable section may be resiliently deformable.

Advantageously, the deformable section may partially or wholly recover its initial shape once the capsule is removed from the beverage preparation machine. This may make the capsule more suitable for re-use.

The first and second sections may be articulated to one another. Alternatively or in addition, the first and second sections may be interconnected by a hinge. Alternatively or in addition, the first and second sections may be interconnected by a crumple zone. Alternatively or in addition, the first and second sections may be interconnected by a concertinable section.

The capsule may comprise a cup and a cup cover; the cup comprising a base and a peripheral sidewall which extends from the base to an edge defining a cup opening which opposes the base; the cup cover being connectable with the cup to close the cup opening to form the beverage ingredient compartment; wherein the peripheral sidewall of the cup comprises the deformable section.

In this case the cup may be formed unitarily. The cup may be formed in a single piece as a moulding. The deformable section may be formed during the moulding step or may be formed by an operation, such as stamping, cutting, scoring, heat treatment or bending, after the moulding step.

In an alternative aspect the first and second sections may be separate and may be slidably connected together. The sliding connection may be a simple interference fit between the first and second sections. Alternatively, a sealing device, for example a gasket or o-ring may be provided between the first and second sections. Alternatively the first and or second section may be provided with a resilient edge or face for engagement with the other of the first and second sections.

The capsule may further comprise one or more of an inlet filter within the capsule and an outlet filter within the capsule. The filters may act to prevent escape of the beverage ingredient through the pre-formed inlet and outlet of the capsule prior to use. During use the outlet filter may be used to filter particulates of the beverage ingredient from the flow of beverage exiting the capsule. The inlet filter may be adjacent the base of the cup. The inlet filter may be bonded to an inner face of the base of the cup. The outlet filter may be adjacent the cup cover. The outlet filter may be bonded to an inner face of the cup cover.

Alternatively or in addition, the capsule may comprise a separate filter bag containing the beverage ingredient, the filter bag being held within the beverage ingredient compartment.

Advantageously, the use of a separate filter bag may avoid the need to provide an inlet and outlet filter at the inlet and outlet of the capsule. The filter bag may be formed from filtering material, such as filter paper. The filter bag may be provided separately from the remainder of the capsule and inserted into the beverage ingredient compartment by a user immediately prior to use. Such use may make the capsule more suitable for re-use.

Alternatively or in addition, the size of the aperture or apertures of the inlet and outlet may be chosen to be small enough to provide an effective filter for the beverage ingredient.

The beverage ingredient may be an extractable ingredient such as roast and ground coffee or leaf tea. The beverage ingredient may be a soluble or partially soluble ingredient such as chocolate, a dairy-based ingredient such as milk, cream, creamer, or milk powder. The beverage ingredient may be provided in powdered, granulated or liquid form. The beverage ingredient may comprise a mixture or combination of two or more ingredients.

The first and or second sections of the capsule may be shaped to form a close fit with portions of the receptacle of the beverage preparation machine. For example, the peripheral side wall may be sized and shaped to form a tight, generally fluid-tight, seal with a portion of the receptacle of the beverage preparation machine. The capsule may be provided with an external peripheral flange that may be gripped by the beverage preparation machine on insertion of the capsule into the receptacle. The flange may form a generally fluid-tight seal between the capsule and the beverage preparation machine. Advantageously, these adaptions singularly or in combination may help to prevent flow of the aqueous medium by-passing the capsule in use and help increase the quantity of aqueous medium that flows through the beverage ingredient compartment from inlet to outlet.

The pre-formed inlet may comprise a single aperture. Alternatively, the inlet aperture may comprise an array of apertures.

The pre-formed outlet may comprise an array of outlet apertures.

The second section may be generally rigid.

The second section may be connectable with the first section by a snap-fit formation. The snap-fit formation may be repeatedly engagable and releasable. Advantageously, this may make the capsule more suitable for re-use. Alternatively, the second section may be fixedly connected to the first section by bonding. For example, the second section may be ultrasonically welded or adhered to the first section.

The first and second sections may be formed from a plastics material. For example, polypropylene. The material of the first and second sections may be resistant to piercing or tearing even when used in a beverage preparation machine have metal inlet and/or outlet piercers, such as metal probes, knives or relief plates.

The first and second sections may be formed from materials resistant to gas-permeation. Releasable covers may be applied to the outer faces of the first and second sections to form a gas-barrier for the pre-formed inlet and pre-formed outlet prior to use. The releasable covers may be removed prior to insertion of the capsule into the receptacle. Alternatively, the capsule may be formed from material lacking enhanced barrier properties. Instead, one or more of the capsules may be provided within outer packaging, such as a flexible wrapper, which can provide a barrier to gas-permeation.

The first and second sections may be thicker than the deformable section. The intermediate wall section may have a thickness of 0.3 mm. The peripheral side wall of the cup, other than the intermediate wall section, may have a thickness of 0.5 mm. The cup cover may have a thickness of 0.5 mm. The base of the cup may have a thickness of 1.0 to 1.5 mm.

The inlet, outlet filter and filter bag, when present, may be formed from a high wet strength material, for example a non-woven fibre material of polyester. Other materials which may be used include a water-impermeable cellulosic material, such as a cellulosic material comprising woven paper fibres. The woven paper fibres may be admixed with fibres of polypropylene/polyvinyl chloride and/or polyethylene.

The present disclosure also provides a system for preparation of a beverage from a beverage ingredient, the system comprising:

i) a beverage preparation machine; and
ii) a capsule;
wherein the beverage preparation machine comprises:
a receptacle for holding an alternative piercable capsule, a fluid dispensing apparatus for supplying aqueous medium to the receptacle, and an inlet piercer for piercing an inlet in the alternative piercable capsule;
wherein the capsule comprises:
a first section and a second section which together form a beverage ingredient compartment of the capsule in which is received a beverage ingredient;
the first section comprising a pre-formed inlet for entry of aqueous medium into the capsule;
the second section comprising a pre-formed outlet for beverage formed, in use, from the beverage ingredient and the aqueous medium;
wherein the capsule is compressible when the capsule is inserted into the receptacle of the beverage preparation machine by the first section of the capsule being engaged by the inlet piercer of the beverage preparation machine so as to cause movement of the first section of the capsule towards the second section of the capsule without piercing of the first or second sections.

Advantageously, while the beverage preparation machine may be originally designed to receive an alternative capsule that is necessarily pierced or torn in use, the capsule as presently disclosed provides a different capsule that can be used in this type of beverage preparation machine. The present capsule may have the advantages as described above, not least that the capsule may be re-useable and or may utilise beverage ingredients that are either pre-packed in the capsule or provided in a separate filter bag.

In addition, the compression the capsule by means of the inlet piercer may advantageously produce compaction of the beverage ingredient as noted above and also may provide an improved grip of the capsule within the receptacle and better sealing of the second section to the receptacle by means of the compressive force applied to the capsule between the end of the inlet piercer and a point of abutment of the second section against the receptacle.

The capsule of the system may be a capsule as previously described.

The present disclosure also provides a method of preparing a beverage from a beverage ingredient, the method comprising the steps of:

i) inserting a capsule as described above into a receptacle of a beverage preparation machine;
ii) gripping the capsule within the receptacle at least in part by engaging the first section of the capsule with an inlet piercer of the beverage preparation machine without piercing of the capsule by the inlet piercer;
iii) compressing the capsule;
iv) supplying aqueous medium from a fluid dispensing apparatus of the beverage preparation machine to the receptacle so as to pass the aqueous medium through the capsule to form a beverage.

The capsule may be compressed between the inlet piercer and an outlet piercer such as a probe or relief surface of an outlet of the receptacle of the beverage preparation machine, without piercing or tearing of the capsule by the outlet piercer. For example, the relief surface of the beverage preparation machine may be designed to pierce or tear a surface of the alternative capsule. However, the capsule of the present disclosure does not require piercing or tearing to form an outlet.

The compression of the capsule may be accommodated by deformation of a peripheral sidewall of the capsule.

In the above aspects, compression of the capsule may be used to reduce a volume of the beverage ingredient compartment of the capsule.

BRIEF DESCRIPTION OF THE DRAWINGS

Aspects of the present disclosure will now be described, by way of example only, with reference to the accompanying drawings, in which.

DETAILED DESCRIPTION

Figure 6:
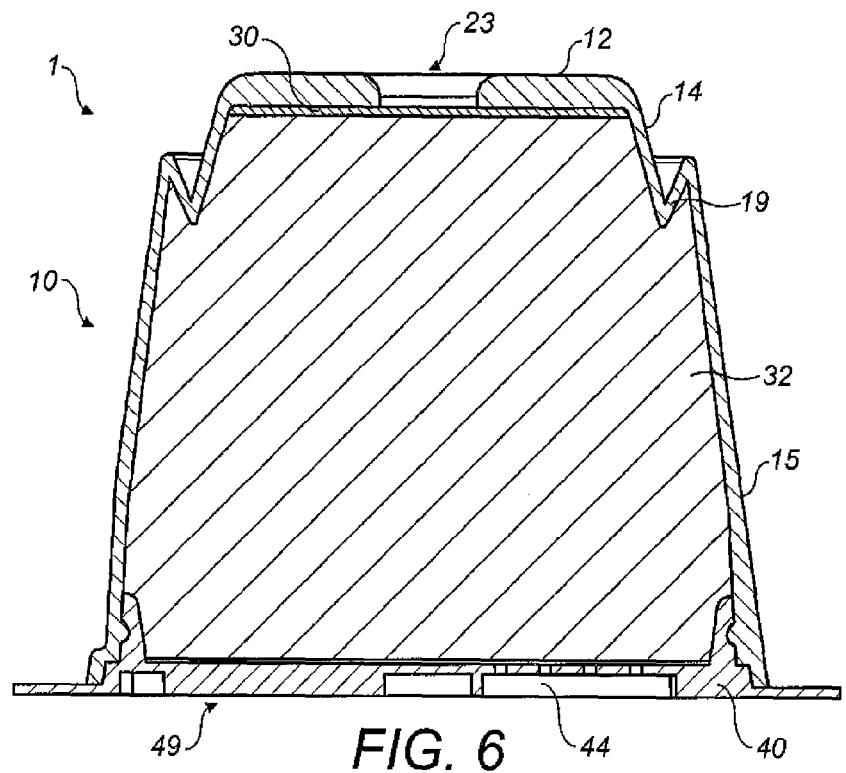
FIG. 6 is a cross-sectional side view of the capsule of FIG. 2 with loose beverage ingredient received in a beverage ingredient compartment of the capsule.
Figure 7:
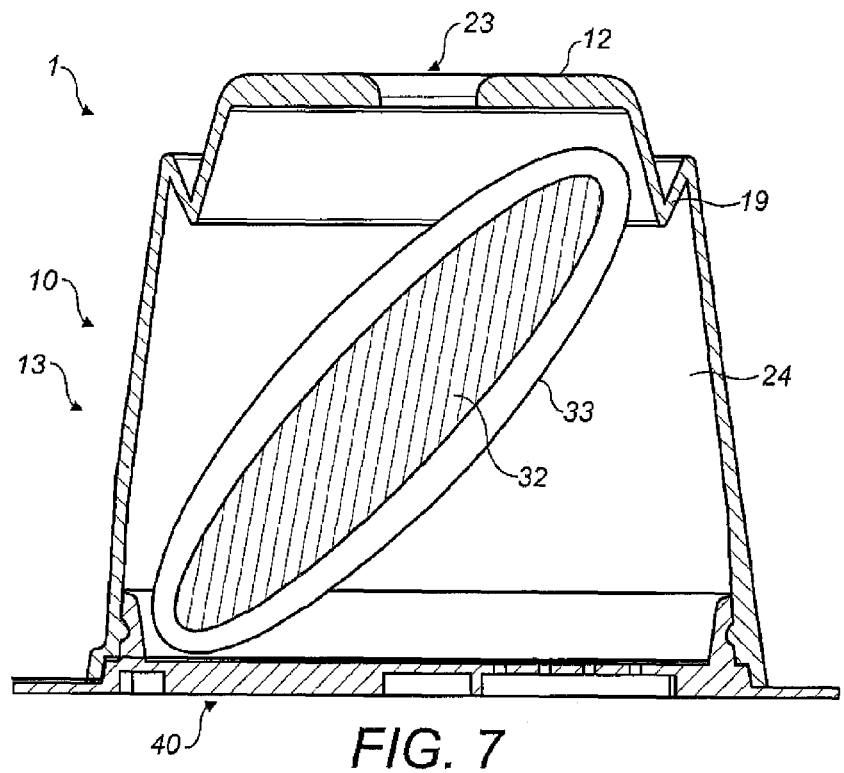
FIG. 7 is a cross-sectional side view of the capsule of FIG. 2 with beverage ingredient contained within a filter bag received in a beverage ingredient compartment of the capsule.
Figure 8:
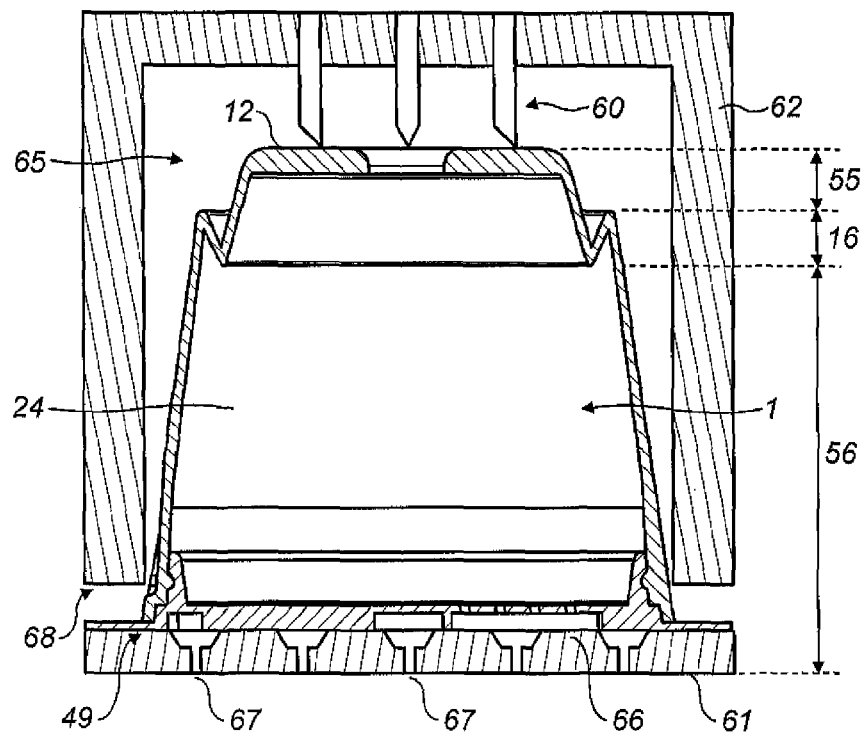
FIG. 8 is a schematic cross-sectional side view of the capsule of FIG. 2 (with the beverage ingredient omitted for clarity) in a beverage preparation machine.

A first aspect of capsule is shown in FIGS. 1 to 8. The capsule 1 is formed from a cup 10, an inlet filter 30, an outlet filter 31 and a cup cover 40. The capsule 1 contains a beverage ingredient 32 as shown in FIGS. 6 and 7.

The cup 10, which is generally frusto-conical in shape, comprises a circular base 12 and a peripheral side wall 13 which extends away from the base 10 to a circular edge 21 that defines a cup opening 20.

The base 12 comprises a generally flat outer face 26 and has a centrally located inlet in the form of an inlet aperture 23 which extends through the base 12 to provide a route for water to enter the capsule 1. The base 12 may have a thickness of 1.0 to 1.5 mm. The inlet aperture 23 is pre-formed in the base 12 at the time of manufacturing the capsule 1. The inlet aperture may have a diameter of 4 mm. Alternatively, the inlet may be formed from a plurality of apertures arrayed over the outer face 26 of the base 12.

The peripheral side wall 13 comprises a proximal section 14 nearest the base 12 and a distal section 15 furthest from the base 12. The proximal section 14 extends from the base 12. The proximal section 14 and distal section 15 are interconnected by an intermediate wall section 19.

The thickness of the proximal section 14 and distal section 15 may be 0.5 mm.

The distal section 15 is provided with an annular inward-facing rib 22 at or near the circular edge 21 which is used for connecting the cup 10 to the cup cover 40 as will be described below.

Figure 1:
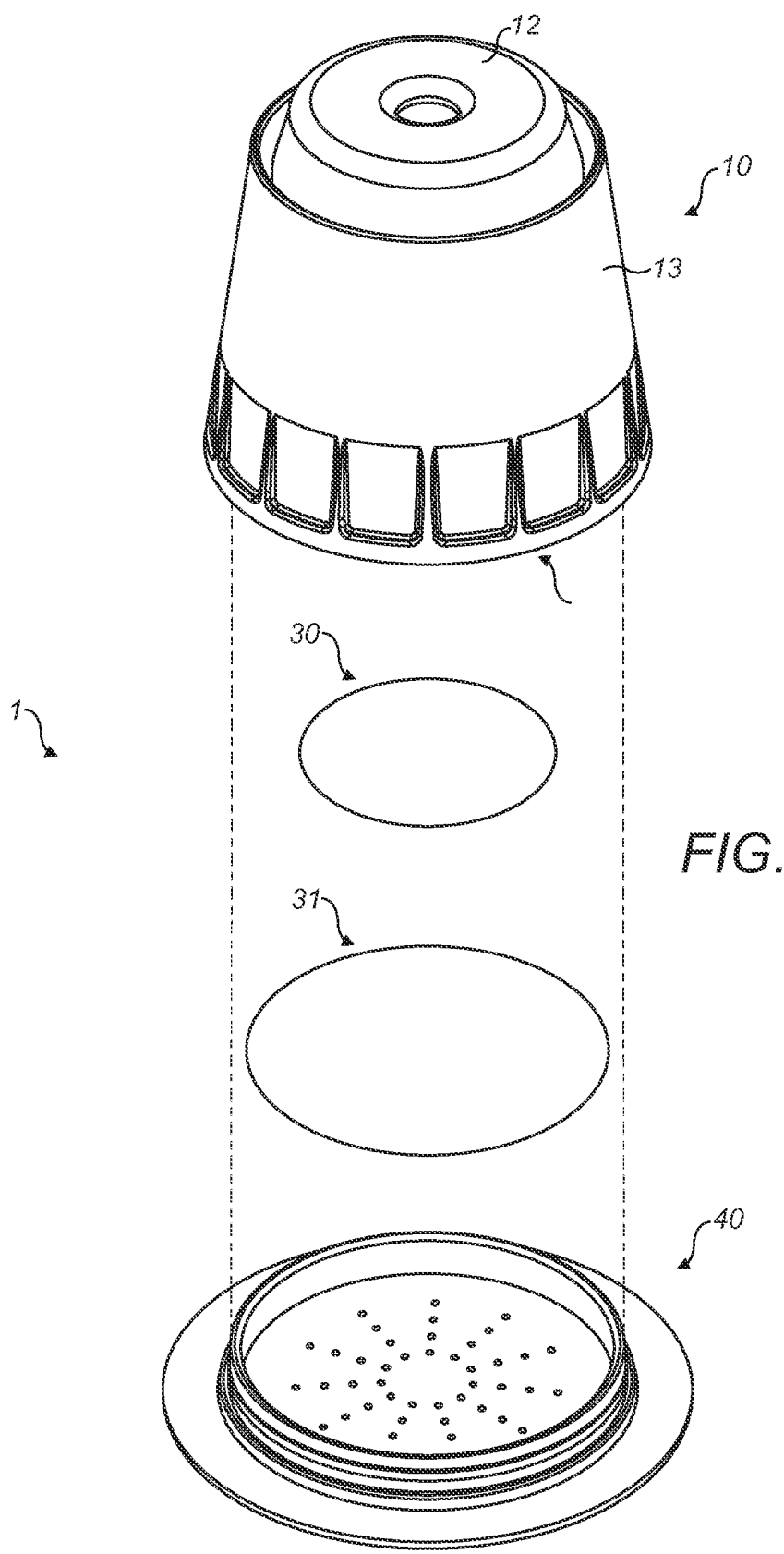
FIG. 1 is an exploded perspective view of a capsule of a first aspect of the present disclosure with the beverage ingredient omitted for clarity.
Figure 2:
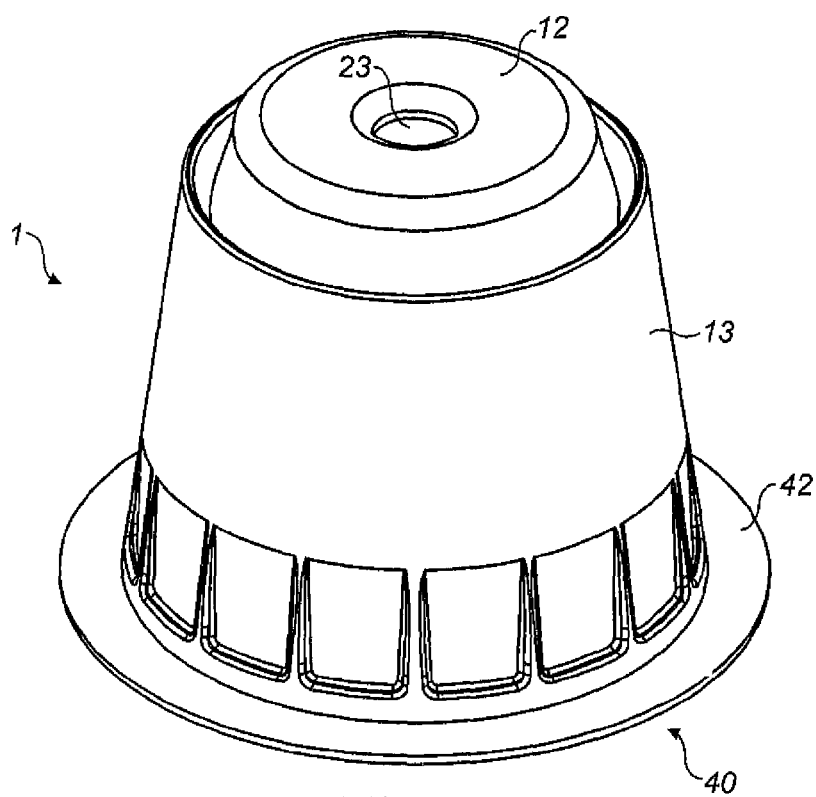
FIG. 2 is a perspective view of the capsule of FIG. 1 in an assembled form.
Figure 3:
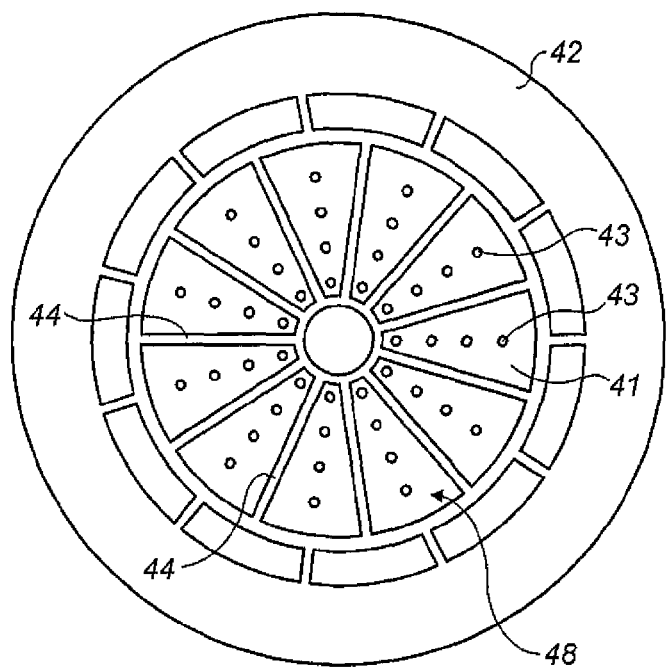
FIG. 3 is a bottom view of the capsule of FIG. 2.
Figure 4:
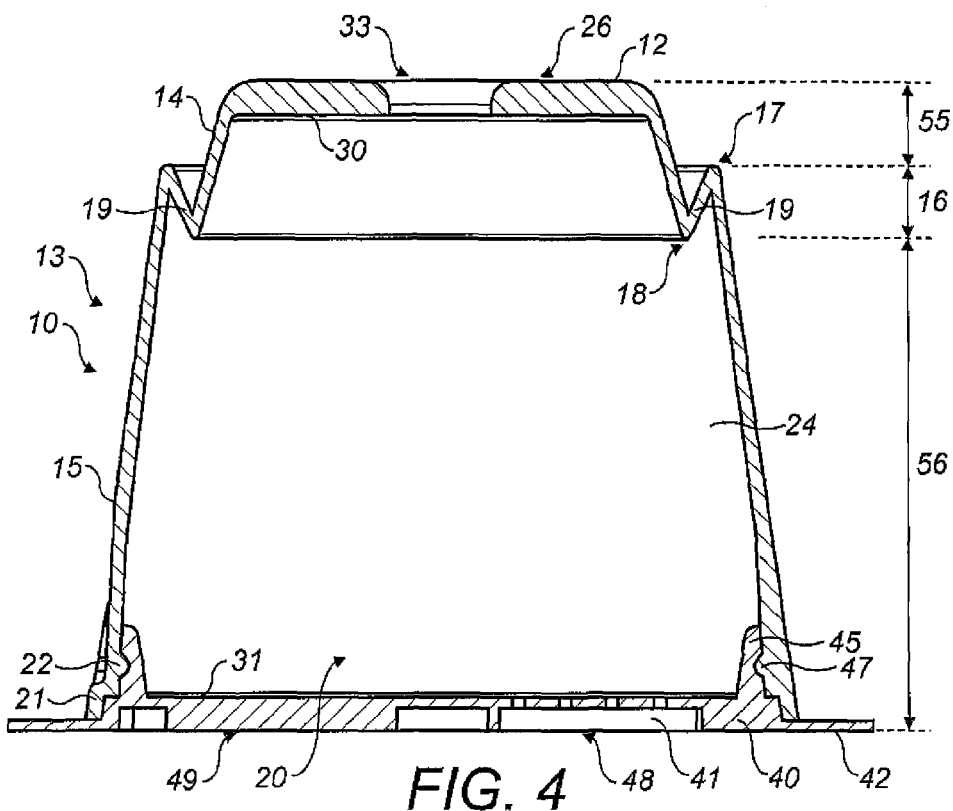
FIG. 4 is a cross-sectional side view of the capsule of FIG. 2 with the beverage ingredient omitted for clarity.
Figure 5:
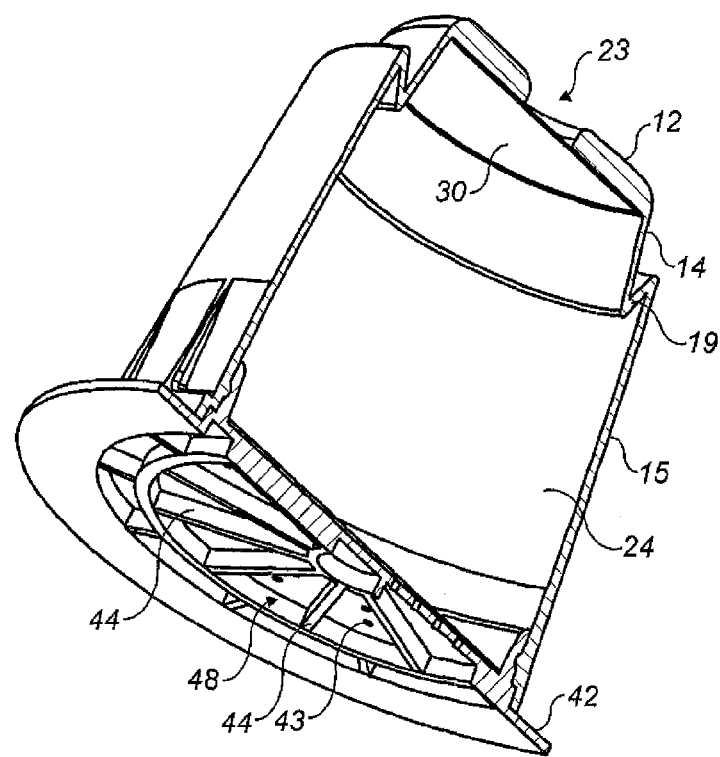
FIG. 5 is a cross-sectional perspective view of the capsule of FIG. 2 with the beverage ingredient omitted for clarity.

A deformable section 16 is formed as a concertina in the side wall 13. The concertina includes two bends/hinges in the shape of the side wall 13 as best shown in FIG. 4. A first, outer bend/hinge 17 is formed towards the proximal end of the distal section 15. A second, inner bend/hinge 18 is formed towards a distal end of the proximal section 14. The intermediate wall section 19 extends between the outer bend/hinge 17 and the inner bend/hinge 18. Thus, while the proximal section 14 and distal section 15 of the side wall 13 diverge as they extend further from the base 12, the intermediate wall section 19 converges as it extends further from the base 12.

The thickness of the intermediate wall section 19 may be 0.3 mm.

The cup 10 (absent any separate filters) is formed as a unitary body with the base 12, proximal section 14, distal section 15 and deformable section 16 forming a single component. The cup 10 may be manufactured as a moulding.

The inlet filter 30 is bonded to an inner face of the base 12 so as to extend across an inner extremity of the inlet aperture 23.

The inlet filter 30 may be formed from a non-woven fibre material of polyester.

The cup cover 40 comprises a generally disc shaped body 41 with an inwardly directed rim 45 extending generally perpendicularly from an inner face 46. The rim 45 is provided with a circumferential channel 47 on an outermost side which co-operates on assembly with the rib 22 of the cup 10 to form a snap-fit connection to retain the cup cover 40 to the cup 10.

A flange 42 is provided at a periphery of the body 41.

An outer face 49 of the cup cover 40 is provided with a plurality of recesses 48 separated from one another by strengthening ribs 44. The cup cover 40 comprises an outlet for beverage to exit the capsule 1 in the form of a plurality of outlet apertures 43 arrayed within the recesses 48.

The outlet apertures 43 are pre-formed in the cup cover 40 at the time of manufacturing the capsule 1. Each outlet aperture may have a diameter of 0.4 mm.

The outlet filter 31 is bonded to the inner face 46 of the cup cover 40 so as to extend across the outlet apertures 43.

The outlet filter 31 may be formed from a non-woven fibre material of polyester.

In an alternative arrangement the recesses 48 and the strengthening ribs 44 may be provided on the inner face 46 of the cup cover 40 with the outer face 49 being generally flat.

The cup cover 40 (absent any separate filters) is formed as a unitary body. The cup cover 40 may be manufactured as a moulding.

The cup 10 and cup cover 40 may be formed from a plastics material such as polypropylene.

To assembly the capsule the cup 10 and cup cover 40 are first manufactured separately. The beverage ingredient 32 is then inserted into the cup 10 (either in loose form or within a filter bag 33 as shown in FIG. 7). The beverage ingredient 32 may be compacted after insertion by tamping the beverage ingredient (or filter bag 33) within the cup 10. The cup cover 40 is then connected to the cup 10 by means of the snap-fit co-operation of the rib 22 and channel 47 to close a beverage ingredient compartment 24 defined by the cup 10 and cup cover 40.

The snap-fit connection between the cup 10 and the cup cover 40 may be designed to be connectable and disconnectable multiple times to allow re-use of the capsule 1 with further quantities of beverage ingredient.

Alternatively, or in addition to, using a snap-fit connection between the cup 10 and cup cover 40, ultrasonic welding may be used to fixedly join the two components where the capsule 1 is intended to be a single use, disposable item.

The height of the capsule 1 is approximately 25 mm and the outer diameter of the capsule 1 (across the outer face 49) is approximately 37 mm.

With the capsule 1 assembled a first section 55 is defined comprising the base 12 and the proximal section 14 of the sidewall 13. A second section 56 is defined comprising the distal section 15 of the sidewall 13 and the cup cover 40. The first section 55 and the second section 56 are interconnected by the deformable section 16.

One or more of the capsules 1 may be packaged in a wrapper to provide an oxygen barrier to protect and preserve the beverage ingredient 32 prior to use.

In use, the capsule 1 is placed in an open receptacle housing 62 of a suitable single serve beverage preparation machine with the outer face 49 of the cup cover 40 abutting an outlet platen 61 of the beverage preparation machine.

The receptacle housing 62 is then closed in the normal manner which typically uses a lever mechanism to move an inlet piercer 60 inwardly into, or further into, a receptacle chamber 65. When such a mechanism is used with an alternative capsule that is designed to be pierced in use, this movement of the inlet piercer causes the inlet piercer to pierce an inlet in the capsule base. However, as shown schematically in FIG. 8, with the capsule 1 of the present disclosure this movement of the inlet piercer 60 results in engagement of the inlet piercer 60 against the base 12 of the capsule and compression of the capsule 1 without piercing or tearing of the base 12. The capsule 1 is compressed between the inlet piercer 60 and the outlet platen 61. The compressive force produced by the inlet piercer 60 acts to press the outer face 49 against the outlet platen 61 to form an effective seal between the capsule 1 and the receptacle to largely prevent by-pass flow of water around the exterior of the capsule 1. A lower rim 68 of the receptacle housing 62 may also engage an upper face of the peripheral flange 42 to further press the cup cover 40 against the outlet platen 61.

Compression of the capsule 1 results in the first section 55 being moved towards the second section 56. For a capsule having a height of approximately 25 mm the amount of movement may be between 0.3 and 1.0 mm. In one example the amount of movement is approximately 0.75 mm.

The outlet platen 61 may comprises one or more relief elements 66 intended to tear or pierce a cover of an alternative capsule. Channels between the relief elements 66 lead to outlet drain holes 67 which are fluidly connected downstream to a dispensation point. However, the cup cover 40 of the present capsule 1 is sufficiently strong not to torn or pierced when compressed. The cup cover 40 may be designed such that the outer face 49 is out of contact with the relief elements 66 when initially inserted into the receptacle chamber 65.

To dispense a beverage, an aqueous medium, typically hot water, is injected into the receptacle chamber 65 through the inlet piercer 60. The water may typically be under a pressure of up to 7 to 12 bar. The water then enters the capsule 1 through the inlet aperture 23 and inlet filter 31 where it contacts the beverage ingredient 32. Beverage is then formed by, for example, extraction of the beverage ingredient 32. The beverage then passes through the outlet filter 31, where any unwanted particulates are retained, an exits the capsule 1 through the outlet apertures 43 into the recesses 48. The beverage then flows from the recesses through the channels formed between the relief elements 66 and out of the outlet drain holes 67.

After dispensation the capsule 1 may be ejected from the receptacle housing 62 or manually removed. The capsule 1 may then be re-used or disposed of as appropriate.

Figure 9:
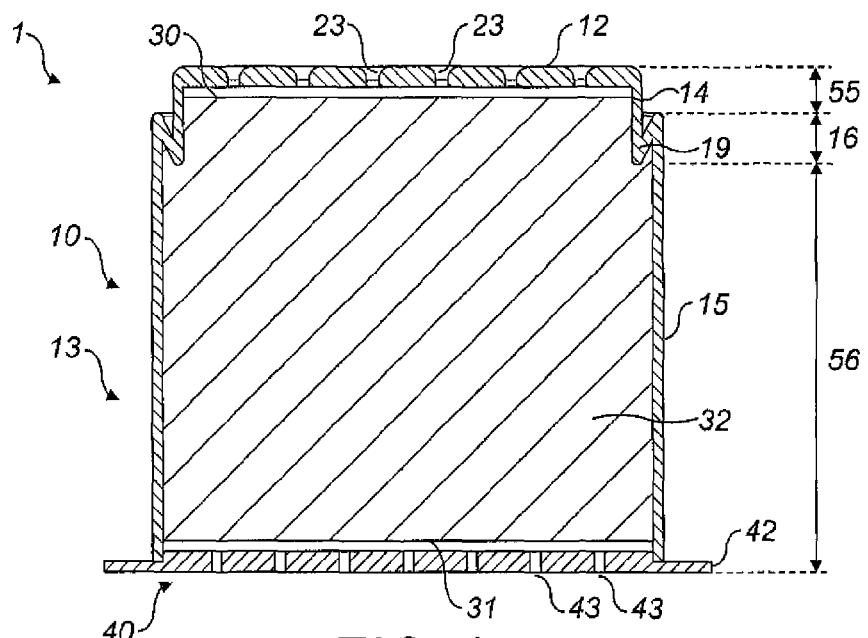
FIG. 9 is a cross-sectional side view of a capsule according to a second aspect of the present disclosure.

A second aspect of capsule is shown in FIG. 9. The capsule 1 is similar to that of the first aspect and like components have been reference with like numerals. In addition, only the differences compared to the first aspect of capsule will be discussed. The cup 10 of the second aspect is cylindrical in shape rather than frusto-conical. In addition, the inlet aperture 23 is provided in the form of a plurality of inlet apertures arranged over a substantial part of the base 12. Assembly and use of the second aspect of capsule may be as described above with respect to the first aspect.

Figure 10:
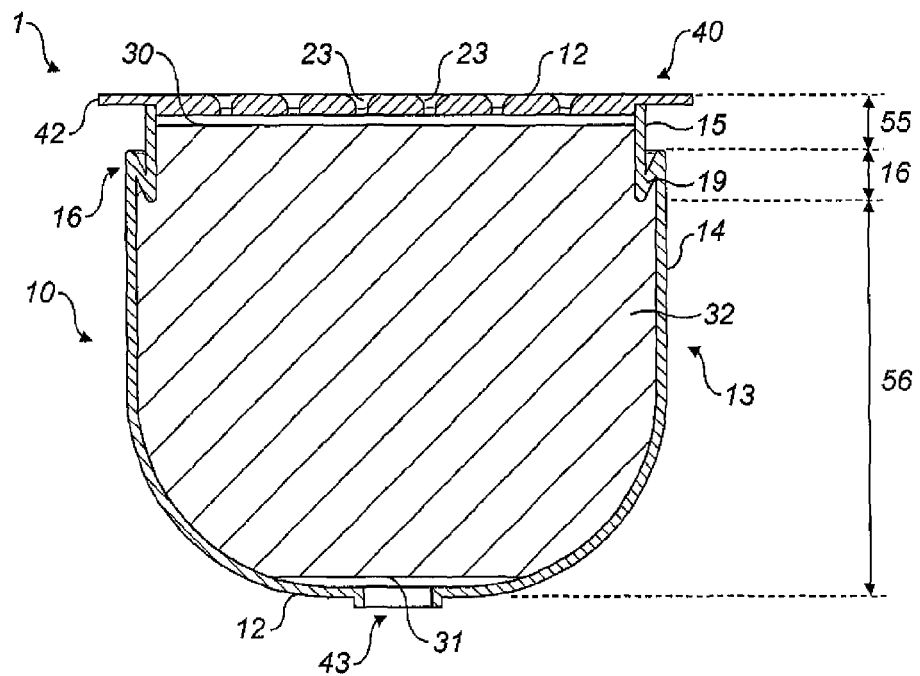
FIG. 10 is a cross-sectional side view of a capsule according to a third aspect of the present disclosure.

A third aspect of capsule is shown in FIG. 10. The capsule 1 is similar to that of the first aspect and like components have been reference with like numerals. In addition, only the differences compared to the first aspect of capsule will be discussed. The cup 10 and cup cover 40 of the third aspect are inverted compared to the first aspect. Thus, the cup cover 40 is provided with the inlet aperture 23 in the form of a plurality of apertures and the base 12 is provided with the outlet aperture 43. When inserted in a beverage preparation machine the cup cover 40 is positioned upper most such that water flows in the direction from the cup cover 40 to the base 12. As with the first aspect of capsule 1, the sidewall 13 comprises a deformable section 16 separating a first section 55 (in this aspect proximal the cup cover 40) from a second section 56 (in this aspect distal the cup cover 40).

Figure 11:
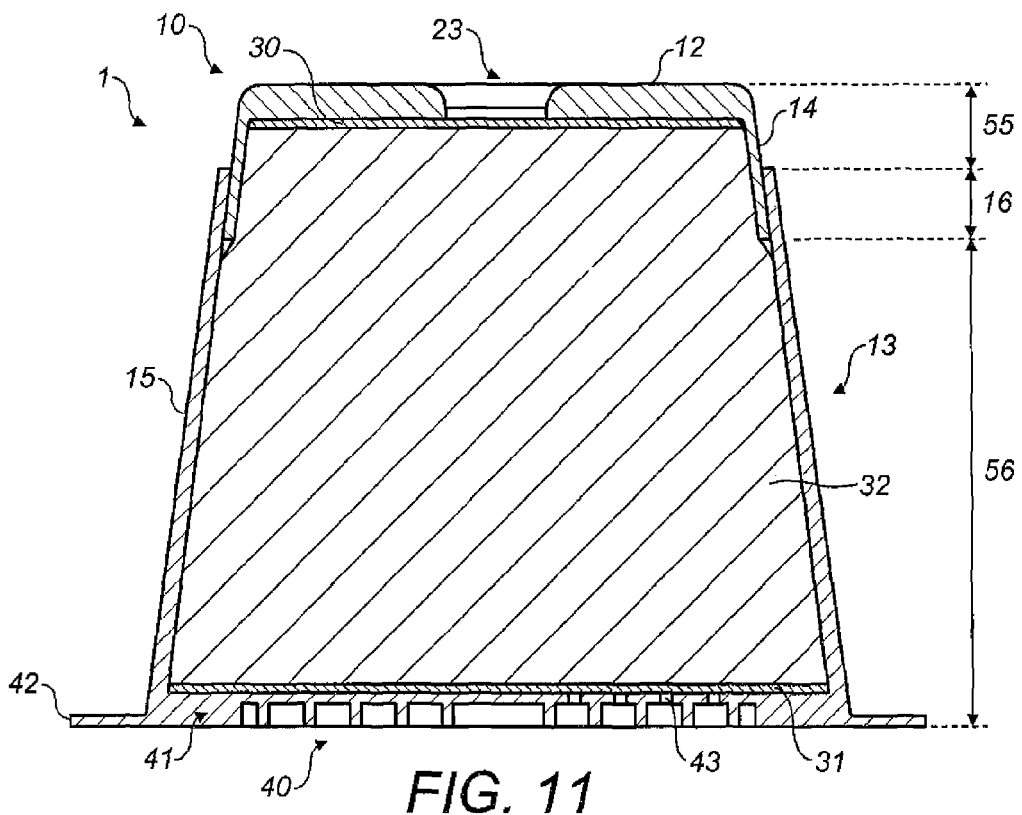
FIG. 11 is a cross-sectional side view of a capsule according to a fourth aspect of the present disclosure.

A fourth aspect of capsule is shown in FIG. 11. The capsule 1 is similar to that of the first aspect and like components have been reference with like numerals. The capsule 1 comprises two separate components. The first component comprises the cup 10 having the base 12 and the proximal section 14 of the peripheral sidewall 13. The second component comprise the distal section 15 of the sidewall 13 and the cup cover 40. Each of the first and second components may be formed as an integral part. Thus both the first and second components may have cup-like forms. The inlet aperture 23 is formed in the base 12 and the outlet apertures 43 are formed in the cup cover 40 as in the first aspect. Inlet and outlet filters may be provided (or a separate filter bag) as described previously.

The first and second components are assembled together as an interference fit with the proximal section 14 of the sidewall 13 sliding within the distal section 15. An additional sealing element, for example a polymeric gasket or o-ring, may be provided to improve the seal therebetween. In this aspect the deformable section 16 comprises the zone of overlap of the interference fit between the cup 10 and the cup cover 40.

In use when inserted into the beverage preparation machine the first section 55 is able to move towards the second section 56 to compress the capsule 1 by the sliding fit of the cup 10 within the cup cover 40.

Of course, the cup cove 40 may be formed to fit within the cup 10 as an interference fit.

Figure 12:
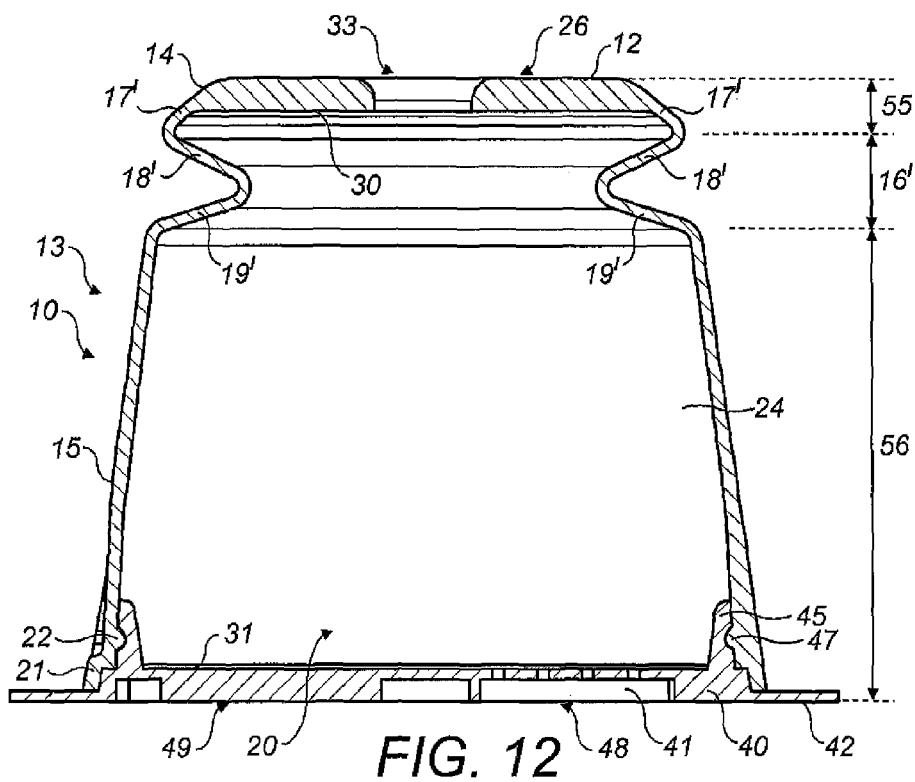
FIG. 12 is a cross-sectional side view of a capsule according to a fifth aspect of the present disclosure with the beverage ingredient omitted for clarity.
Figure 13:
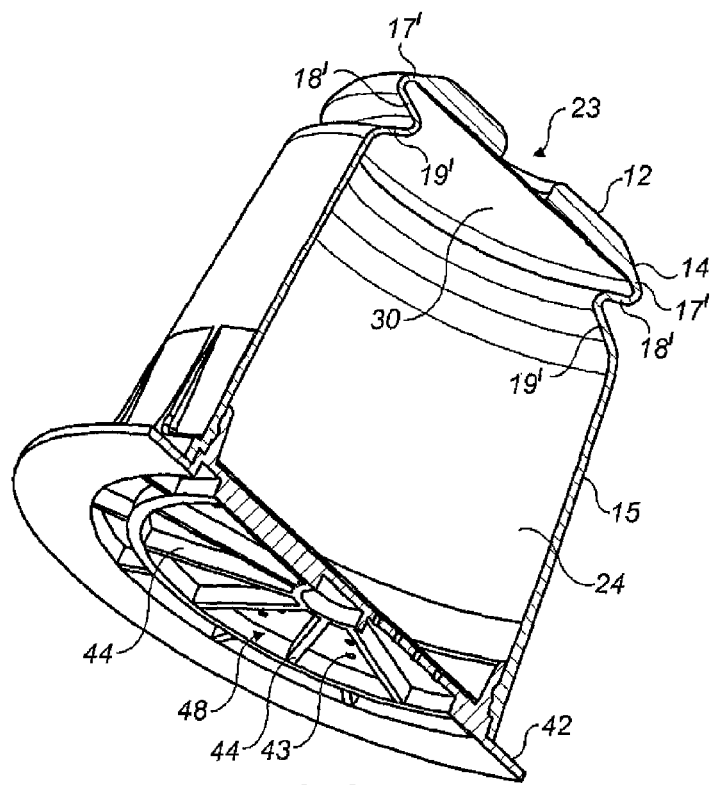
FIG. 13 is a cross-sectional perspective view of the capsule of FIG. 12.

A fifth aspect of capsule is shown in FIGS. 12 and 13. The capsule 1 is similar to that of the first aspect and like components have been reference with like numerals. In this aspect the capsule 1 differs in that the deformable section/crumple zone/concertinable section 16' comprises lower, middle and upper elements 17', 18' and 19' that are substantially perpendicular to the arrangement of the equivalent elements of the deformable section 16 of FIG. 1. In this aspect the elements 17' to 19' are generally laterally orientated.

Figure 14:
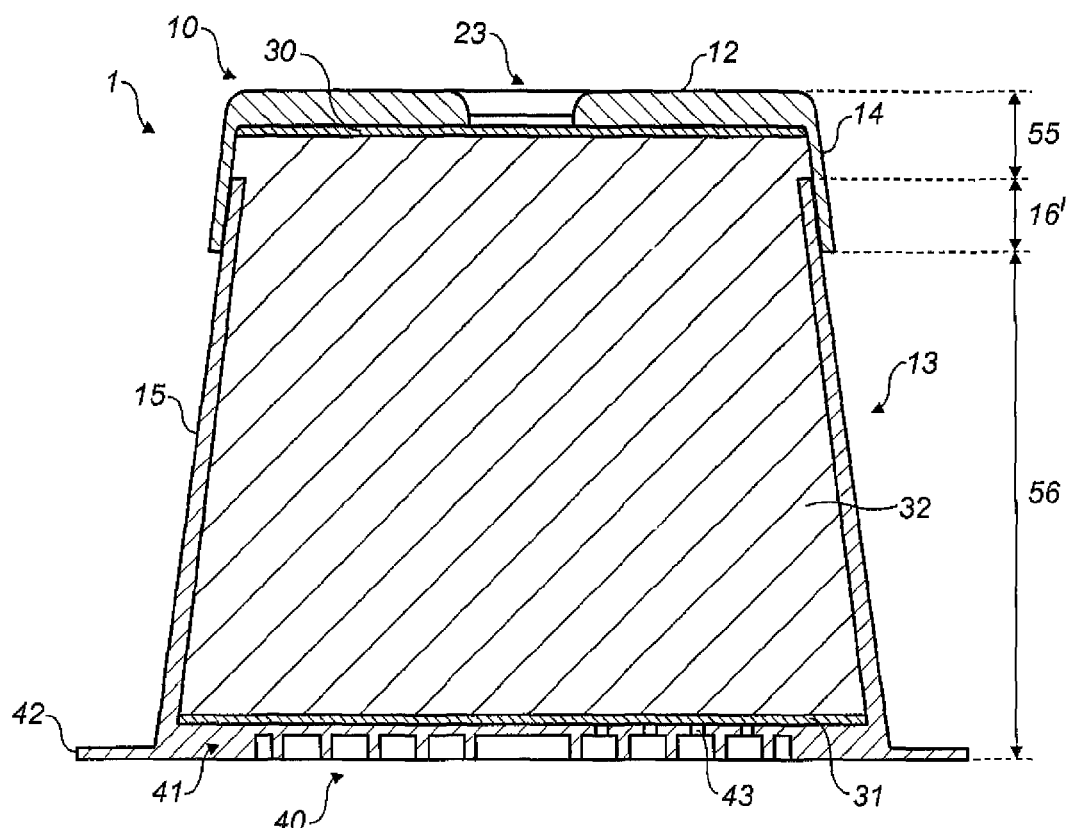
FIG. 14 is a cross-sectional side view of a capsule according to a sixth aspect of the present disclosure.

A sixth aspect of capsule is shown in FIG. 14. The capsule 1 is similar to that of the fourth aspect and like components have been reference with like numerals. In this aspect the capsule 1 differs in that the first and second components are assembled together as an interference fit with the proximal section 14 of the sidewall 13 sliding on the outside face of the distal section 15. As with the fourth aspect, an additional sealing element, for example a polymeric gasket or o-ring, may be provided to improve the seal therebetween. In this aspect the deformable section 16 comprises the zone of overlap of the interference fit between the cup 10 and the cup cover 40.

The invention claimed is:

1. A system for preparation of a beverage from a beverage ingredient, the system comprising:
   i) a beverage preparation machine; and
   ii) a capsule;
   wherein the beverage preparation machine comprises:
   a receptacle for holding the capsule, a fluid dispensing apparatus for supplying an aqueous medium to the receptacle, and an inlet piercer;
   wherein the capsule comprises:
   a first section and a second section which together form a beverage ingredient compartment of the capsule containing the beverage ingredient;
   the first section comprising a pre-formed inlet aperture for entry of the aqueous medium into the capsule;
   the second section comprising a pre-formed outlet aperture for beverage formed, in use, from the beverage ingredient and the aqueous medium; and
   wherein the capsule is compressed when the capsule is inserted into the receptacle of the beverage preparation machine by the first section of the capsule being engaged by the inlet piercer of the beverage preparation machine so as to cause movement of the first section of the capsule towards the second section of the capsule without piercing the first or second sections.

2. The system as claimed in claim 1 wherein the first and second sections are interconnected by a deformable section.

3. The system as claimed in claim 2 wherein the first and second sections are thicker than the deformable section.

4. The system as claimed in claim 2 wherein the deformable section is resiliently deformable.

5. The system as claimed in claim 1 wherein the first and second sections are articulated to one another.

6. The system as claimed in claim 1 wherein the first and second sections are interconnected by a hinge.

7. The system as claimed in claim 1 wherein the first and second sections are interconnected by a crumple zone.

8. The system as claimed in claim 1 wherein the first and second sections are interconnected by a concertinable section.

9. The system as claimed in claim 2 wherein the capsule comprises a cup and a cup cover,
   the cup comprising a base and a peripheral sidewall which extends from the base to an edge defining a cup opening which opposes the base;
   the cup cover being connectable with the cup to close the cup opening to form the beverage ingredient compartment;
   wherein the peripheral sidewall of the cup comprises the deformable section.

10. The system as claimed in claim 9 wherein the cup is formed unitarily.

11. The system as claimed in claim 1 wherein the first and second sections are separate and are slidably connected together.

12. The system as claimed in claim 1 further comprising one or more of an inlet filter within the capsule and an outlet filter within the capsule.

13. The system as claimed in claim 1 further comprising a separate filter bag containing the beverage ingredient, the filter bag being held within the beverage ingredient compartment.

14. The system as claimed in claim 1 wherein the capsule has a base wall that engages with the inlet piercer of the beverage receptacle, and a peripheral wall extending from the base wall and defining an outer periphery of the capsule, wherein the base wall has a thickness greater than that of the peripheral wall to inhibit the inlet piercer of the beverage preparation machine from piercing the cartridge.

15. The system as claimed in claim 1 wherein the capsule comprises a capsule cover, wherein the capsule cover comprises a plurality of recesses separated from one another by strengthening ribs.

16. The system as claimed in claim 15 wherein the cover has a strength such that said cover is not torn or pierced when compressed in the beverage receptacle.

17. The system as claimed in claim 1 wherein the pre-formed inlet aperture is formed in a base of the capsule and the pre-formed outlet aperture is formed in a cover of the capsule, wherein the capsule further comprises an inlet filter bonded to an inner face of the base of the capsule and an outlet filter bonded to an inner face of the cover of the capsule.

18. A method of preparing a beverage using the system of claim 1, the method comprising the steps of:
   i) inserting the capsule into the receptacle of the beverage preparation machine;
   ii) gripping the capsule within the receptacle at least in part by engaging the first section of the capsule with the inlet piercer of the beverage preparation machine without piercing of the capsule by the inlet piercer;
   iii) compressing the capsule by the first section of the capsule being engaged by the inlet piercer of the beverage preparation machine so as to cause movement of the first section of the capsule toward the second section of the capsule without piercing the first or second sections of the capsule;
   iv) supplying the aqueous medium from the fluid dispensing apparatus of the beverage preparation machine to the receptacle so as to pass the aqueous medium through the capsule to form the beverage from the beverage ingredient in the capsule and the aqueous medium.

19. The method as claimed in claim 18 wherein the capsule is compressed between the inlet piercer and a relief surface of an outlet of the receptacle of the beverage preparation machine, without piercing or tearing of the capsule by the relief surface.

20. The method as claimed in claim 18 wherein the compression of the capsule is accommodated by deformation of a peripheral sidewall of the capsule.

* * * * *